Oct. 28, 1958     L. SCHARFF     2,858,070
MOMENT COMPUTING AND INDICATING SYSTEMS
Filed Nov. 17, 1955     3 Sheets-Sheet 1
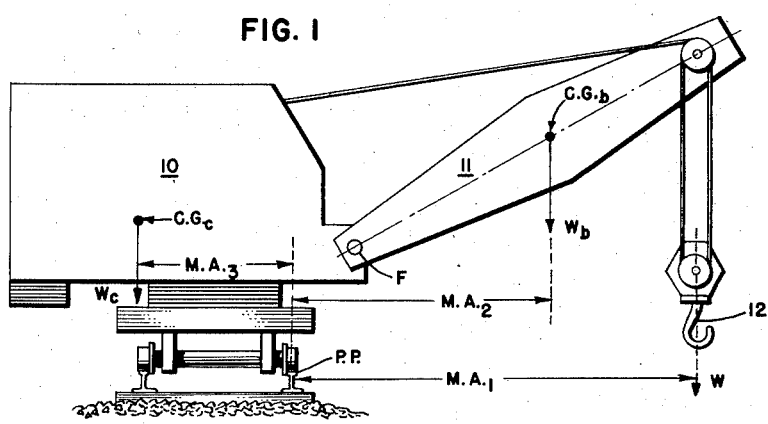
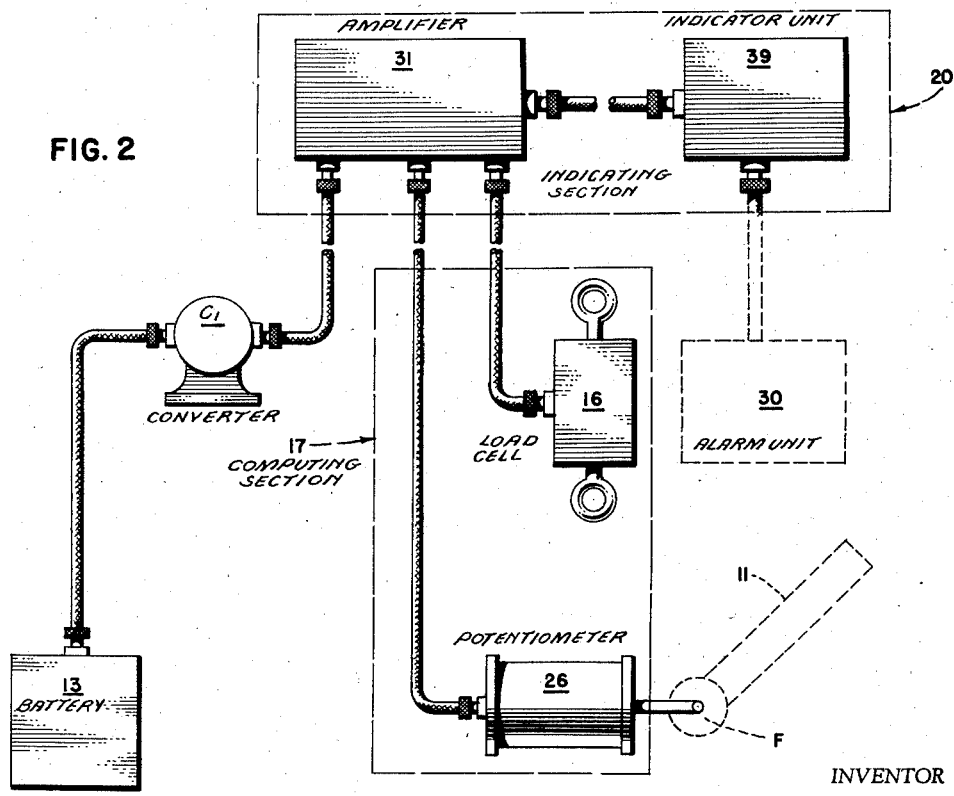
INVENTOR
LEON SCHARFF
BY
ATTORNEYS Oct. 28, 1958     L. SCHARFF     2,858,070
MOMENT COMPUTING AND INDICATING SYSTEMS
Filed Nov. 17, 1955     3 Sheets-Sheet 2
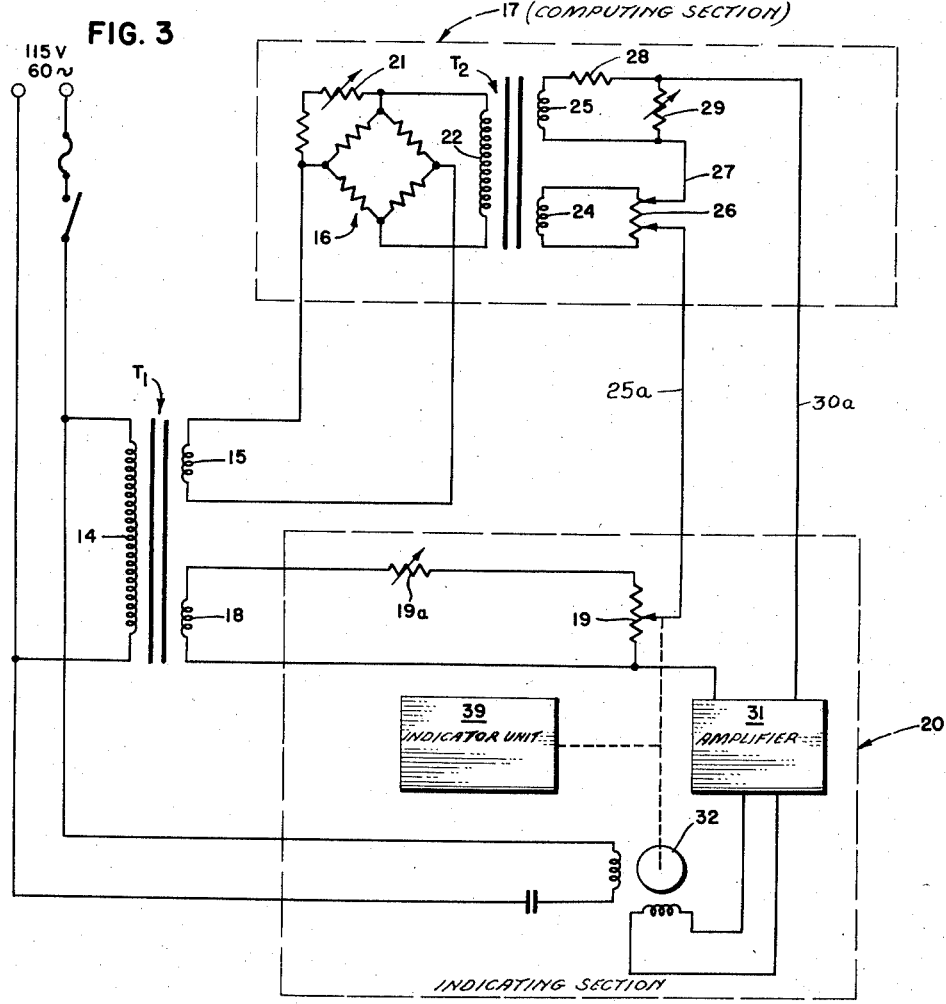
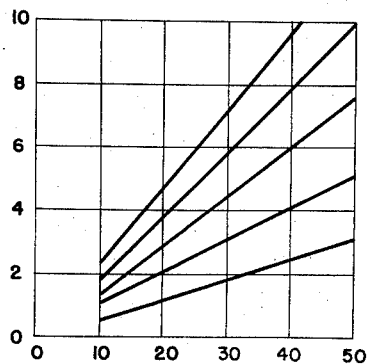
FIG. 4
INVENTOR
LEON SCHARFF
BY
ATTORNEYS Oct. 28, 1958     L. SCHARFF     2,858,070
MOMENT COMPUTING AND INDICATING SYSTEMS
Filed Nov. 17, 1955     3 Sheets-Sheet 3

INVENTOR
LEON SCHARFF

United States Patent Office 2,858,070
Patented Oct. 28, 1958

2,858,070

MOMENT COMPUTING AND INDICATING SYSTEMS

Leon Scharff, Vestal, N. Y.

Application November 17, 1955, Serial No. 547,589

5 Claims. (Cl. 235—61)

(Granted under Title 35, U. S. Code (1952), sec. 266)

The invention herein described and claimed may be manufactured and used by or for the Government of the United States of America for governmental purposes without payment of any royalties thereon or therefor.

The present invention relates to moment computing and indicating systems and more particularly, as disclosed herein, to such systems as applied to certain types of material handling equipment such, for example, as cranes.

Heretofore, the operation of certain types of material handling equipment under heavy load has been hazardous to both human life and property. One of the primary hazards of heavy load operation of such equipment is the danger of an overturning or tipping over of the equipment. This hazard is present in any equipment which is constructed to support a load to be lifted at a distance from the center of gravity of the equipment such as a crane, for example.

Accidents have frequently occurred when a heavily loaded crane boom has been elevated or lowered to a certain position relative to the earth. The weight on the crane boom is seldom known by the operator. Consequently, an overturning accident may occur should a certain combination of load weight and boom length be reached or exceeded, for example in excess of the moment created by the counterbalancing weight of the crane. Similarly, the counterbalancing weight of the equipment may be insufficient to prevent an overturning accident when the load is moved arcuately because the load is thereby swung outwardly and away from the center of gravity of the equipment under the influence of centrifugal force thus increasing the effective length of the moment arm which tends to tip over the equipment. Still another contributing factor in overturning accidents is the use of a tag line on certain types of equipment. The tag line causes the load to be moved outwardly and away from the center of gravity of the equipment, and, as in rotating the load through an arcuate path, increases the effective length of the moment arm. Thus, when operating with a load weight, boom length and angle combination which creates a moment dangerously near that sufficient for producing an overturning of the equipment, the use of the tag line may increase the moment arm sufficiently to cause an unfortunate and costly accident, one in which human life is endangered and severe damage to the equipment as well as the load is likely to result.

The present invention provides a system whereby this hazard may be completely obviated and thereby renders such equipment completely safe for heavy load operation under all conditions which may be encountered in actual service. The manner in which these advantageous results are accomplished will be fully described hereinafter. First, however, a consideration of the prior art will be helpful.

Numerous attempts have been made to eliminate or partially eliminate the foregoing hazards of operation of certain types of material handling equipment.

Signal systems for cranes have been devised which provide electrically operated visual indicators of load weight and boom angle, the weight and angle first being mechanically determined and then converted into electrical responses by the energization of alarm circuitry.

Another prior system included electrical measuring circuits for determining the "tip" moment which, by such prior system, was designated as $P(D \sin X)$ where P represents the load, D is the horizontal boom radius, and X is the angle between vertical and the boom. That system included a bridge circuit which was balanced when no load was on the crane. When the crane was subjected to a load, the bridge was thrown into an unbalanced condition by a strain gauge which electrically measured the load. The output from the bridge circuit was rectified and then was fed to one coil of a D. C. wattmeter, thereby energizing one coil of the wattmeter in proportion to the load. The boom angle was measured by a rotary type A. C. voltage regulating transformer. The secondary winding of this transformer was the rotary winding and was rotated by the movement of the boom in a vertical plane. The current from the secondary winding was rectified and applied to the remaining coil of the wattmeter. Therefore, a current proportional to the load and a current proportional to the boom angle were combined in the wattmeter to indicate tilt moment. An alarm was provided to warn the operator in the event the moment approached dangerously close to the optimum which, if exceeded would overturn the crane. This optimum moment was determined by either calculation or measurement.

Yet another attempt to eliminate the overturning hazard of crane operation has embodied the use of a phase sensitive A. C. bridge for measuring various quantities. The bridge unbalanced voltage was amplified and coupled to grids of electron discharge devices having anodes of the same polarity. One or the other of the discharge devices conducts through a suitable coupling to rotate a motor shaft in either a forward or reverse direction, depending upon which discharge device is conducting. The motor shaft varies the position of an indicator needle within view of the operator, thereby providing him with knowledge as to any condition being measured such as any condition of a physical, chemical or electrical nature. The bridge balance is restored by potentiometer means.

There have been other attempts to eliminate the overturning accidents which sometimes occur during heavy load operation of cranes. However, no system has been devised heretofore which is capable of solving the moment equation disclosed hereinafter, this equation being complete for accurately determining moment under all conditions of operation. It is believed that the combination of means by which this equation is solved is novel and highly useful.

As will become more clearly apparent as the description proceeds, the present invention contemplates a computer which electronically analogs the moment equation, hereinafter set forth, the output of the computer being an electrical signal which has a magnitude proportional to the actual moment. An indicator is provided which shows the magnitude of the signal received from the computer. The indicator may be, if desired, a voltmeter calibrated to read the moment directly. One form of the invention disclosed herein also includes a relay unit having a plurality of preset relay circuits sequentially energized at predetermined signal levels, the input signals being fed to the relays from the computer. There is also included an interlock and alarm unit which actuates interlock and alarm systems whenever this unit receives a signal from the relay unit.

Accordingly, one object of the present invention is to provide a moment computing and indicating system which will indicate to an operator the existence of a predetermined moment.

Another object of the instant invention is the provision of a moment computer which electronically analogs, without interruption, the moment created by a load at any distance, within the operating capabilities of the system, from a predetermined point.

A further object of this invention resides in the provision of an electronic computer capable of computing a moment equation of such a character that a high order of sensitivity and accurateness of moment indication is attained.

It is a further object of this invention, as applied to material handling equipment, to provide a moment computing and indicating system which may be installed readily in a standard crane or other material handling equipment without expensive reconstruction of the equipment.

Yet another object of my invention is the provision of a moment computing and indicating system which is constructed of commercially available components.

Still a further object of the present invention is to provide a moment computing and indicating system which, when applied to a crane or other similar material handling equipment, will eliminate the possibility of an operator overestimating the load capabilities of the equipment.

Another object of this invention resides in the provision of a moment computing system including an A. C. bridge circuit which is never rebalanced during operation.

An additional object is to provide a moment computing and indicating system which is rugged in construction and highly adaptable for field use without requiring sensitive adjustments.

A further object resides in the provision of a moment computing and indicating system which is highly reliable in operation, the system having a minimum number of moving parts.

Other objects and many of the attendant advantages of this invention will be readily appreciated as the same becomes better understood by reference to the following detailed description when considered in connection with the accompanying drawings wherein:

Fig. 1 is a schematic representation of a railroad crane and discloses the factors involved in moment computation in accordance with one embodiment of the present invention;

Fig. 2 is a diagrammatic representation of an arrangement of the apparatus employed for computing the moment in accordance with this embodiment of the invention;

Fig. 3 is a circuit diagram illustrating the circuitry involved in the system disclosed in Fig. 2;

Fig. 4 is a graphical illustration of the operator's moment chart, the various chart values being read from the indicator meter and then plotted as actual moments for various operating conditions encountered by a hypothetical crane in which the system disclosed in Figs. 2 and 3 has been installed;

Figure 5:
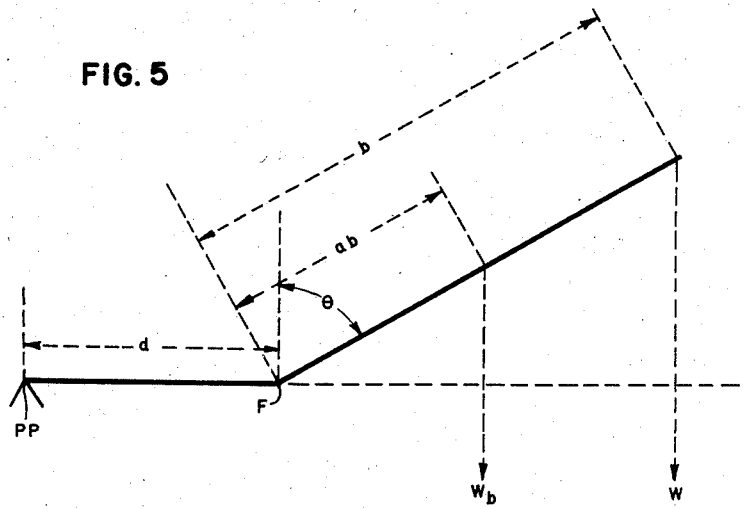
Figure 6:
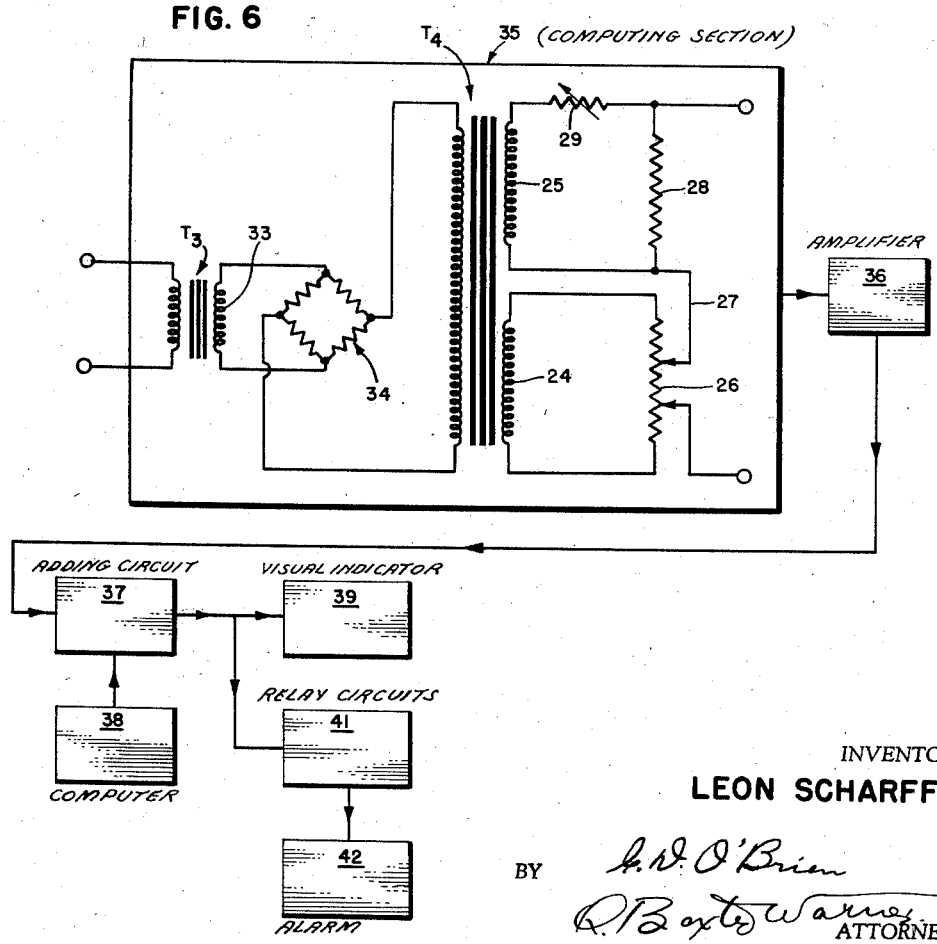

Fig. 5 is an abbreviated schematic representation of a crane and discloses the factors involved in the moment computation in accordance with a second embodiment of the invention; and Fig. 6 is a combined circuit and block diagram illustrating the novel combination of electrical and electronic components for the computation of moments, the constant visual indication thereof, the sequential indication thereof, and for the provision of an interlock and alarm system, all in accordance with the second embodiment of the present invention.

Referring now to the drawings and more particularly to Fig. 1 thereof, it will be noted that a railroad type crane 10 is there illustrated with the boom 11 elevated at an angle of approximately 30 degrees relative to the earth. The crane hook 12 has suspended therefrom a load vectorially represented by the arrow $w$. The weight of the boom is represented by the vector $w_b$ at the center of gravity C. G.$_b$ of the boom. The moment arm of the load is represented by the distance $MA_1$ and that of the boom is represented by $MA_2$.

The cab, wheels, axles, and remaining structure of the crane has a weight $w_c$ which may be thought of as being concentrated at the center of gravity of the cab C. G.$_c$ at a distance $MA_3$ from the pivot point PP about which the entire crane would rotate should it overturn while in the position illustrated. It will be apparent that the moment $w_c \times MA_3$ must be greater than $$w_b \times MA_2 + w \times MA_1$$

under all conditions of operation in order that the crane will not overturn.

The actual moment tending to overturn the crane is computed by the present invention and may be mathematically expressed by the following equation, reference being made to Fig. 5:

(1) $m = (w + aw_b)b \sin \theta + (w + aw_b)d + w_b d(1-a)$ where
$w$ = weight of the load;
$w_b$ = weight of the boom;
$b$ = crane arm length;
$ab$ = distance from center of gravity of boom to pivot point;
$a$ = distance from center of gravity of boom to pivot point divided by crane arm length;
$\theta$ = angle that the boom makes with the vertical;
$d$ = distance between the pivot point PP and the fulcrum F; and
$m$ = moment about the fulcrum of the boom.

The derivation of Equation 1 is as follows:

(2) $m = w(b \sin \theta + d) + w_b(ab \sin \theta + d)$
(3) $m = wb \sin \theta + wd + w_b ab \sin \theta + w_b d$
(4) $m = (w + aw_b)b \sin \theta + dw + dw_b + adw_b - adw_b$
(5) $m = (w + aw_b)b \sin \theta + d(w + aw_b) + w_b d(1-a)$ Referring now to Fig. 2, it will be noted that any convenient source of electric power may be utilized such, for example, as the storage battery 13 commonly found on cranes. Battery 13 is connected to converter $C_1$ to thereby convert the D. C. voltage of battery 13 to an A. C. voltage of any desired frequency and potential, 115 volts at 60 cycles per second having been found to be satisfactory in this regard.

Considering the embodiment of the invention illustrated in Fig. 3, it will be observed that the primary winding 14 of transformer $T_1$ is connected across the source of A. C. voltage. Transformer $T_1$ is provided with a split secondary winding. Secondary winding 15 is connected across the load cell 16, alternatively referred to as the unit weight cell, in the computing section which is generally referenced by numeral 17. Secondary winding 18 is connected across a bucking potentiometer 19 in the indicating section, generally indicated by numeral 20.

Turning now to a consideration of the computing section 17, as is most clearly shown in Fig. 3, variable resistance 21 is provided for the purpose of enabling the operator to preset certain known factors of Equation 1, set forth hereinbefore, into the system. One such factor which is preset into the system by the adjustment of variable resistor 21 is the weight of the crane boom $w_b$. Other factors of Equation 1 which are introduced into the system by presetting resistor 21 will be mentioned later. Load cell 16 is connected to the primary winding 22 of another split secondary transformer $T_2$ having secondary windings 24 and 25. Winding 24 is connected to a sine potentiometer 26 which is connected in any suitable manner to the crane boom whereby the resistance of this potentiometer is simultaneously varied as angle $\theta$ is increased or decreased during the operation of the crane. It will be apparent that sine potentiometer 26 may be so constructed as to produce an output proportional to the analog of the sine of boom angle $\theta$, which necessarily will be always less than unity thereby producing a reduced quantity as an output. This output from sine potentiometer 26 is added via conductor 27 to the output of secondary winding 25 after the latter output has been passed through resistors 28 and 29, resistor 29 being preset for a purpose to be more fully understood as the description proceeds.

In the initial alignment of the system for the computation and indication of moments created during the operation of a crane in which the system is installed, the factor $b$ is introduced into Equation 1, previously set forth, by adjusting variable resistor 19a between secondary winding 18 and resistor 19. With resistors 26 and 29 short circuited and resistor 19 set at its minimum value, the signal entering the indicator motor amplifier 31 will be at a null. Since the quantities $w_b$, $d$ and $a$ are known, the dial pointer of the indicator meter may then be manually preset to read the quantity $w_b d(1-a)$. The fixed quantity $w_b d(1-a)$ is preset on the indicator meter at the indicator unit 39, referred to again later. After presetting the indicator dial pointer, resistor 26 is set to an open circuit position. A known weight $W_0$ is then attached to the boom and the boom is preset to a predetermined angle $\theta_0$. Since $W_0$, $\theta_0$ and $b$ are known, resistor 19a may be adjusted until the system gain is such that the indicator pointer is driven to a position reading of the moment value of $W_0 b \sin \theta_0 + w_b d(1-a)$. After the system gain has been properly calibrated, resistor 19a is not readjusted. Resistor 21 is restored back into the circuit and resistor 29 is short circuited. Now utilizing the known weight $W_0$ at the end of the boom and angle $\theta_0$, resistor 21 is adjusted until the indicator dial reads $(W_0 + a w_b) b \sin \theta_0 + w_b d(1-a)$. The final step in system alignment is to remove resistor 29 from its shorted condition. Then resistor 29 is adjusted until the indicator dial reads $(W_0 + a w_b) b \sin \theta_0 + (W_0 + a w_b) d + w_b d(1-a)$. After the system is calibrated, the weight $W_0$ is removed from the boom. Now the system will compute the moment value for any combination of angle and weight.

The voltage output of computing section 17 is the analog of $(w + a w_b) b \sin \theta + (w + a w_b) d$. The load cell 16, or unit weight cell, produces an electrical output proportional to $(w + a w_b)$. Sine potentiometer 26 introduces an electrical signal representing the angle $\theta$ to the moment equation, and the resistance network comprising resistors 28 and 29 introduce to that equation an electrical representation of a function of $d$, the distance from the pivot point PP to the fulcrum F. Bucking voltage is applied to the amplifier 31 by way of conductor 25a which connects the sine potentiometer 26 to the bucking potentiometer 19 and thence via conductor 30a to the amplifier. Thus it will be evident that when the foregoing factors are fed into the adding circuit via conductor 27, the output therefrom will be the electrical representation of $(w + a w_b) b \sin \theta + (w + a w_b) d + w_b d(1-a)$ which is Equation 1.

Expressed differently, the steps to be followed in initially aligning the system are first presetting an indicating meter dial at 39, referred to again later, for the fixed quantity $w_b d(1-a)$. Then resistor 29 is shorted and resistor 21 is set to an open circuit position to provide the electrical equivalent of $wb \sin \theta$ by adjusting variable resistor 19a using a known load weight $w$ and a known angle $\theta$. Next resistor 21 is adjusted in such a manner as to result in the provision of the electrical signal representative of $(w + a w_b) b \sin \theta$. Resistor 29 is then adjusted to provide the quantity $(w + a w_b) d$. Finally, the several factors are added, as aforementioned, in the computer section 17 thereby resulting in an electrical signal proportional to the actual moment $m$ as defined by Equation 1.

The output of the computer section 17 is fed to amplifier 31 which produces an output capable of energizing an indicator motor 32. Thus the crane operator is continuously supplied with information as to the magnitude of the moment which tends to overturn the crane.

The indicator unit 39 may include a meter, aforementioned, which provides for the operator a continuous visual check on the moment computed by the system. An alarm unit 30, Fig. 2, may be suitably connected to indicator unit 39 to warn the operator of moments in excess of a predetermined value. There may also be provided a chart such as that illustrated in Fig. 4, for example, in the cab within easy vision of the operator. Fig. 4 illustrates various moments in foot-pounds for a hypothetical crane for various hook loads and turning radii. Such a chart can be plotted for any crane by the employment of the present invention. Such a chart can be of much value to an operator in preventing an overturning accident when the chart values are combined with information relating to the overturning moment for various hook loads and turning radii, such information being commonly supplied by crane manufacturers.

In Fig. 6 an alternative embodiment of the present invention is illustrated. In accordance with this form of the invention, transformer $T_1$ of Fig. 3 which was characterized as having a split secondary winding has been replaced by transformer $T_3$ having only one secondary winding 33 connected across a Wheatstone bridge 34. The computing section, generally indicated by numeral 35 in Fig. 6, is substantially identical to the computing section of the first embodiment, except as to that portion of the computing section which is illustrated on the left side of transformer $T_4$ in Fig. 6. This difference in the computing sections to the left of transformer $T_4$, Fig. 6, and to the left of transformer $T_2$, Fig. 3 and the aforementioned differences in secondary windings of transformer $T_3$, Fig. 6, and transformer $T_1$, Fig. 3, necessarily results in differences in the manner in which Equation 1 is solved.

The differences in which the embodiment of the invention disclosed in Fig. 6 functions to compute and indicate moments as compared with the manner in which the first form of the system functions will become apparent from the following description.

After computer 35 computes the analog of $$(w + a w_b) \sin \theta + (w + a w_b) \frac{d}{b}$$

the resistance network comprising resistors 28 and 29 introducing the ratio of the distance between the pivot point PP and the fulcrum F to the crane arm length, e. g.

$$\frac{d}{b}$$

to the moment Equation 1, substantially in the manner hereinbefore described in connection with Figs. 2 and 3, the output from computing section 35 is fed into a scaling amplifier 36. Amplifier 36 may be of any conventional design suitable for the purpose of multiplying the computer output by the factor $b$. Therefore, the output from amplifier 36 will be proportional to the analog of $$(w + a w_b) b \sin \theta + (w + a w_b) d$$

Any suitable adding circuit of conventional design, generally represented by block 37, may be employed for the purpose of adding the output of amplifier 36 and a conventional computer 38. Computer 38 is so designed as to produce an output proportional to the analog of $w_b d(1-a)$. Therefore, the output of adding circuit 37 is the electrical analog of $$(w + a w_b) b \sin \theta + (w + a w_b) d + w_b d(1-a)$$

this being representative of the actual moment at any instant of crane operation and for any turning radius and hook load. It will be readily understood that the amplifier 36, adding circuit 37, and computer 38 could be combined in one housing, if so desired, without affecting the inventive concept disclosed and claimed herein.

A visual indicator, generally represented by block 39, may be provided. Such an indicator may be in the form of a voltmeter which will indicate the magnitude of the signal received from adding circuit 37, this signal being proportional to moment $m$. Therefore, the voltmeter may be calibrated to directly indicate the actual moment tending to overturn the equipment.

A plurality of conventional relay circuits, block 41, also may be connected to adding circuit 37. Each relay is preset to close a circuit individual thereto when the output signal from adding circuit 37 reaches a predetermined voltage level. Each relay may energize an intermediate indicating device, not shown, if so desired. Therefore, in addition to the direct reading voltmeter 39 which continuously indicates the moments created during crane operation, the operator is also provided with a group of indicating devices such, for example, as panel lights, buzzers, bells or any other type indicating device whereby information regarding large or small changes in moment, as may be desired, will be conveyed to the operator.

When all relay circuits 41 have been closed, the output of adding circuit 37 is connected to any suitable interlock and master alarm system 42. The circuitry of the present invention is preset for each crane installation so that this condition of all relay circuits being closed will occur only when the moment tending to overturn the equipment dangerously approaches the moment capable of producing such an accident. Of course, any suitable safety factor can be preset into the system. When the interlock and alarm system 42 has been actuated, the crane will be rendered inoperative to increase the moment for a temporary period until the opreator reduces the existing moment by either reducing the load, the turning radius, or the angle $\theta$.

The only variables in any crane installation are the hook load $w$ and the angle $\theta$. As aforementioned, these variables are respectively measured and electrically introduced into the system by load cell 16 and sine potentiometer 26. All other factors in Equation 1 are preset into the system in the manner previously mentioned, and this may be readily accomplished by the operator and requires no special tools or skill.

It will be apparent that the sine potentiometer can be preset to compensate for certain conditions of the support upon which the crane is carried. For example, if the crane is one which is mounted upon a railway vehicle, the dip angle of the track relative to the horizon can be introduced into the system merely by presetting the electrical equivalent of such dip angle into the sine potentiometer 26. Similarly, if the crane is mounted upon a barge, the degree of roll and pitch of the barge can be preset into the system.

Although the present invention has been disclosed in association with a crane, it is to be understood that the inventive concept is not so limited. The inventive concept disclosed herein may be advantageously employed in any installation or equipment in which a computation of moment is desired. Expressed in a slightly different manner it may be stated that the present invention can be employed to advantage in connection with any equipment which is subjected to variable loads at various angles between a portion of the equipment and the vertical. For example, the system of the present invention may be employed when it is desired to determine moments exerted against an aircraft wing or a fin or other structure of a guided missile under various flight conditions.

In Figs. 3 and 6 the computing sections 17 and 35, respectively, are illustrated as including certain components in addition to load cell or bridge 16 and potentiometer 26. However, it will be understood that such additional components may, if desired, be physically located elsewhere in the system provided, of course, that the circuitry functions in the same manner. For example, such additional components have been removed from the computing section 17 as illustrated in Fig. 2 and could be located within amplifier 31.

Briefly stated in summary, the present invention contemplates the provision of a new and improved method and apparatus for electrically and electronically computing moment in accordance with Equation 1, aforementioned, and to continuously indicate to an operator the moment created by any load at any distance, within the operating capabilities of the system, from a predetermined point.

While the invention has been disclosed in particularity to examples thereof which give satisfactory results, it readily will be apparent to those skilled in the art that further embodiments and modifications may be made without departing from the spirit and scope of the invention as defined by the claims appended hereto.

I claim:

1. In a structure having a boom pivotally mounted for elevation and depression and capable of suspending weights of varying magnitudes from the free end thereof and being movable to assume an infinite number of inclined positions in a vertical plane between positions of maximum depression and maximum elevation, a moment computing and indicating system for continuously computing and indicating moments affecting the structure comprising a source of electric power, a computer including a Wheatstone bridge responsive to the load on the boom and connected across said source of power, said computer further including a sine potentiometer mechanically connected to the boom for adjustment in accordance with the angular attitude of the boom and electrically connected at the input side thereof to the output side of said bridge, means electrically connected to the outputs of said bridge and potentiometer for producing an output signal having a magnitude proportional to the moment created by various loads on the structure, and means for indicating the magnitude of said signal.

2. A moment computing and indicating system as set forth in claim 1 wherein said signal producing means is further characterized as comprising circuitry for producing an output signal proportional to the moment in accordance with the equation $$m = (w + aw_b) b \sin \theta + (w + aw_b) d + w_b d(1 - a)$$

where $w$ = weight of the load; $w_b$ = weight of the boom; $b$ = crane arm length; $ab$ = distance from center of gravity of boom to pivot point; $a$ = distance from center of gravity of boom to pivot point divided by crane arm length; $\theta$ = angle that the boom makes with the vertical; $d$ = distance between the pivot point of the structure should it overturn and the fulcrum of the boom; and $m$ = moment about the fulcrum of the boom.

3. In a structure having a boom pivotally mounted for elevation and depression and capable of suspending weights of varying magnitudes from the free end thereof and being movable to assume an infinite number of inclined positions in a vertical plane between positions of maximum depression and maximum elevation, a moment computing system for continuously computing moments as applied to the structure when subjected to various loads and comprising a source of electric power, a Wheatstone bridge responsive to the load on the boom and connected across said source, a split secondary type transformer having the primary winding thereof connected across the output of said bridge, a sine potentiometer mechanically connected to the boom for adjustment in accordance with the angular attitude of the boom and electrically connected across one secondary winding of said transformer, a variable resistor connected across the other secondary winding of said transformer, and an adding circuit connecting the output sides of said sine potentiometer and said variable resistor to one another whereby the actual moment is computed, the moment computed being in accordance with the equation $$m = (w + aw_b)b \sin \theta + (w + aw_b)d + w_b d(1-a)$$

where $w$=weight of the load; $w_b$=weight of the boom; $b$=crane arm length; $ab$=distance from center of gravity of boom to pivot point; $a$=distance from center of gravity of boom to pivot point divided by crane arm length; $\theta$=angle that the boom makes with the vertical; $d$=distance between the pivot point about which the structure would rotate if it should overturn and the fulcrum of the boom; and $m$=the moment about the fulcrum of the boom.

4. In a structure having a boom pivotally mounted for elevation and depression and capable of suspending weights of varying magnitudes from the free end thereof and being movable to assume an infinite number of inclined positions in a vertical plane between positions of maximum depression and maximum elevation, a moment computing and indicating system for continuously computing and indicating moments affecting the structure comprising; a source of A. C. voltage, a first split secondary type transformer having the primary winding thereof connected across said source, a Wheatstone bridge circuit responsive to the load on the boom and having the input terminals thereof connected across one of the secondary windings of said transformer, a second transformer of the split secondary type having the primary winding thereof connected across the output terminals of said bridge circuit, a variable resistor shunt connected between an input terminal and an output terminal of said bridge circuit, a sine potentiometer having a pair of output terminals and mechanically connected to the boom for adjustment in accordance with the angular attitude of the boom and electrically connected to one of the secondary windings of said second transformer, a second variable resistor connected across another of said secondary windings of said second transformer, one side of said last-mentioned resistor being connected to one output terminal of said sine potentiometer, an amplifier having a pair of input terminals, one of said amplifier input terminals being connected to the other side of said last-mentioned resistor, a third variable resistor and a bucking potentiometer serially connected to one another and across the other secondary winding of said first transformer, the variable tap of said bucking potentiometer being connected to the other output terminal of said sine potentiometer, the other input terminal of said amplifier being connected to said bucking potentiometer, and an indicator motor connected across the output of said amplifier.

5. In a structure having a boom pivotally mounted for elevation and depression and capable of suspending weights of varying magnitudes from the free end thereof and being movable to assume an infinite number of inclined positions in a vertical plane between positions of maximum depression and maximum elevation, a moment computing and indicating system for continuously computing and indicating moments affecting the structure comprising; a source of A. C. voltage, a computer section including a first transformer having the primary thereof connected across said source, a Wheatstone bridge responsive to the load on the boom and having the input terminals thereof directly connected across the secondary winding of said transformer, a second transformer of the split secondary type having the primary winding thereof connected across the output terminals of said bridge, a sine potentiometer electrically connected across one of the secondary windings of said second transformer and being mechanically connected to the boom for adjustment in accordance with the angular attitude of the boom, and a variable resistance network connected across the other secondary winding of said second transformer, said resistance network and said sine potentiometer outputs being connected in summing relationship, an amplifier connected to the output of said computer section, a second computer, an adding circuit having the input side thereof connected to the output of said amplifier and said second computer, a visual indicator connected to the output of said adding circuit for indicating a signal proportional to the moment, and an interlock and alarm system having the input side thereof connected to the output of said adding circuit whereby the boom will be rendered inoperative to increase the moment to a magnitude greater than a predetermined value.

References Cited in the file of this patent
UNITED STATES PATENTS

| | | |
|---|---|---|
| 2,310,955 | Hornfeck | Feb. 16, 1943 |
| 2,471,292 | Taylor | May 24, 1949 |
| 2,540,807 | Berry | Feb. 6, 1951 |

OTHER REFERENCES

Electronic Analog Computers (Korn and Korn) 1952, pages 11 and 281.